United States Patent
Yamamoto

(10) Patent No.: US 12,235,395 B2
(45) Date of Patent: Feb. 25, 2025

(54) DISTANCE MEASURING DEVICE

(71) Applicant: DENSO CORPORATION, Kariya (JP)

(72) Inventor: Masahiro Yamamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 1030 days.

(21) Appl. No.: 17/190,809

(22) Filed: Mar. 3, 2021

(65) Prior Publication Data

US 2021/0190924 A1 Jun. 24, 2021

Related U.S. Application Data

(63) Continuation of application No. PCT/JP2019/034438, filed on Sep. 2, 2019.

(30) Foreign Application Priority Data

Sep. 5, 2018 (JP) .................... 2018-165988

(51) Int. Cl.
*G01S 7/497* (2006.01)
*G01S 13/931* (2020.01)
*H05B 3/84* (2006.01)

(52) U.S. Cl.
CPC ............ *G01S 7/497* (2013.01); *G01S 13/931* (2013.01); *H05B 3/84* (2013.01); *G01S 2007/4977* (2013.01)

(58) Field of Classification Search
CPC ...... G01S 7/497; G01S 13/931; G01S 7/4043; G01S 17/931; G01S 7/4813; H05B 3/84
See application file for complete search history.

(56) References Cited

U.S. PATENT DOCUMENTS

| | | | | |
|---|---|---|---|---|
| 2009/0206068 | A1* | 8/2009 | Ishizeki | B32B 17/10385 |
| | | | | 219/203 |
| 2014/0320845 | A1 | 10/2014 | Bayha et al. | |
| 2017/0361809 | A1* | 12/2017 | Nagae | B60S 1/56 |
| 2019/0200416 | A1* | 6/2019 | Shinkai | B60R 11/04 |
| 2019/0283533 | A1* | 9/2019 | Lombrozo | G01S 13/931 |
| 2020/0275533 | A1* | 8/2020 | Ochiai | G03B 17/55 |

FOREIGN PATENT DOCUMENTS

| | | | |
|---|---|---|---|
| JP | H06-258713 | A | 9/1994 |
| JP | H08-29535 | A | 2/1996 |
| JP | H09-119978 | A | 5/1997 |
| JP | 2009196401 | A | 9/2009 |
| JP | 2017-138761 | A | 8/2017 |

* cited by examiner

*Primary Examiner* — Isam A Alsomiri
*Assistant Examiner* — Joseph C Fritchman
(74) *Attorney, Agent, or Firm* — Maschoff Brennan

(57) ABSTRACT

A distance measuring device is configured to emit a transmitted wave and detect a reflected wave from an object irradiated with the transmitted wave to measure a distance to the object. At least one of the transmitted wave and the reflected wave is transmitted through a transmission window. A heater is configured to heat the transmission window from an inside of the distance measuring device. A control unit is configured to control energization of the heater according to an inside air temperature which is an air temperature inside the distance measuring device and an outside air temperature which is an air temperature outside the distance measuring device.

5 Claims, 8 Drawing Sheets

DISTANCE MEASURING DEVICE

CROSS-REFERENCE TO RELATED APPLICATION

The present application is a continuation application of International Application No. PCT/JP2019/034438 filed on Sep. 2, 2019, which is based on and claims the benefit of priority from Japanese Patent Application No. 2018-165988 filed with the Japan Patent Office on Sep. 5, 2018. The contents of these applications are incorporated herein by reference in their entirety.

BACKGROUND

The present disclosure relates to a distance measuring device. Distance measuring devices that are mounted on a vehicle and measure a distance to an object located in front of the vehicle include a distance measuring device that emits a transmission wave toward the front and detects a reflected wave of the emitted transmitted wave from an object to detect a distance to the object.

SUMMARY

An aspect of the present disclosure is a distance measuring device configured to emit a transmitted wave and detect a reflected wave to measure a distance to a object, and the distance measuring device includes a transmission window, a heater, and a control unit. The heater is configured to heat the transmission window. The control unit is configured to control energization of the heater according to an inside air temperature and an outside air temperature.

DETAILED DESCRIPTION OF THE PREFERRED EMBODIMENTS

In the distance measuring device, in order to protect an irradiation unit that emits a transmitted wave or a detection unit that detects a reflected wave, a cover is provided on the front of these units. However, when snow is adhered to the cover, the measurement accuracy of the distance measuring device may be reduced.

Thus, JP H8-29535 A discloses that a cover of a distance measuring device is provided with a heater to melt snow.

However, as a result of detailed studies, the inventor has found a problem that fogging may occur on the cover due to a temperature difference between the inside and the outside of the distance measuring device. When fogging occurs particularly on a transmission window of the cover through which a transmitted wave or a reflected wave is transmitted, the measurement accuracy of the distance measuring device may be reduced.

An aspect of the present disclosure provides a distance measuring device capable of preventing fogging of a transmission window.

An aspect of the present disclosure is a distance measuring device configured to emit a transmitted wave and detect a reflected wave from an object irradiated with the transmitted wave to measure a distance to the object, and the distance measuring device includes a transmission window, a heater, and a control unit. At least one of the transmitted wave and the reflected wave is transmitted through the transmission window. The heater is configured to heat the transmission window from an inside of the distance measuring device. The control unit is configured to control energization of the heater according to an inside air temperature which is an air temperature inside the distance measuring device and an outside air temperature which is an air temperature outside the distance measuring device.

With such a configuration, energization of the heater is controlled according to the inside air temperature and the outside air temperature; thus, fogging of the transmission window can be prevented.

Exemplary embodiments of the present disclosure will be described below with reference to the drawings.

1. First Embodiment

1-1. Configuration

Figure 1:
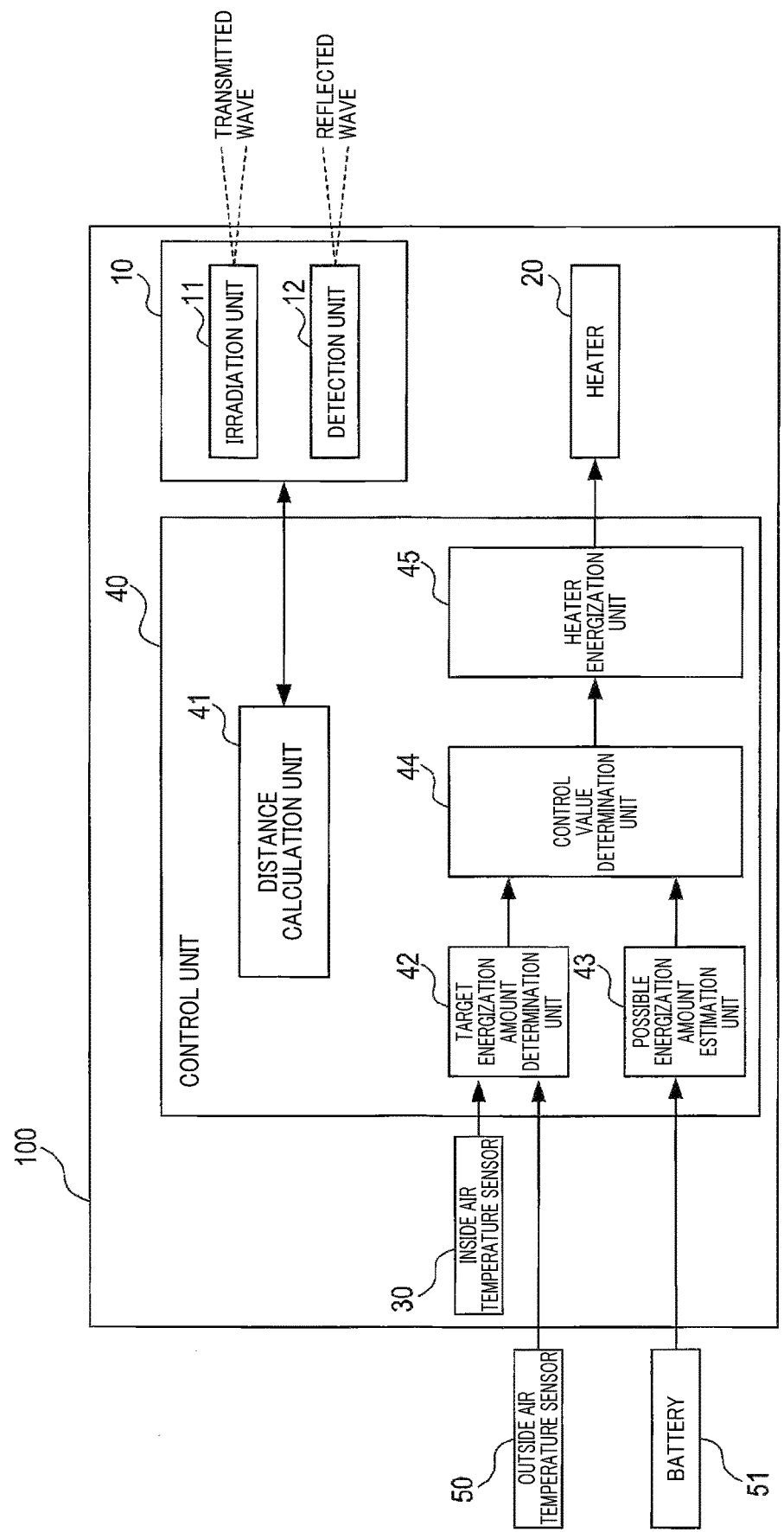
FIG. 1 is a block diagram showing a configuration of a lidar device of a first embodiment.

A lidar device 100 shown in FIG. 1 is a distance measuring device that emits light as a transmitted wave and detects a reflected wave from an object irradiated with the light to measure a distance to the object. The term lidar is also written as LIDAR. LIDAR is an abbreviation for light detection and ranging. The lidar device 100 is mounted on a vehicle and used to detect various objects that are present in front of the vehicle.

The lidar device 100 includes a measurement device 10, a heater 20, an inside air temperature sensor 30, and a control unit 40.

The measurement device 10 includes an irradiation unit 11 that emits light and a detection unit 12 that detects a reflected wave of the light. The irradiation unit 11 emits a laser beam as light. The detection unit 12 receives a reflected wave from an object and converts the reflected wave into an electrical signal.

Figure 2:
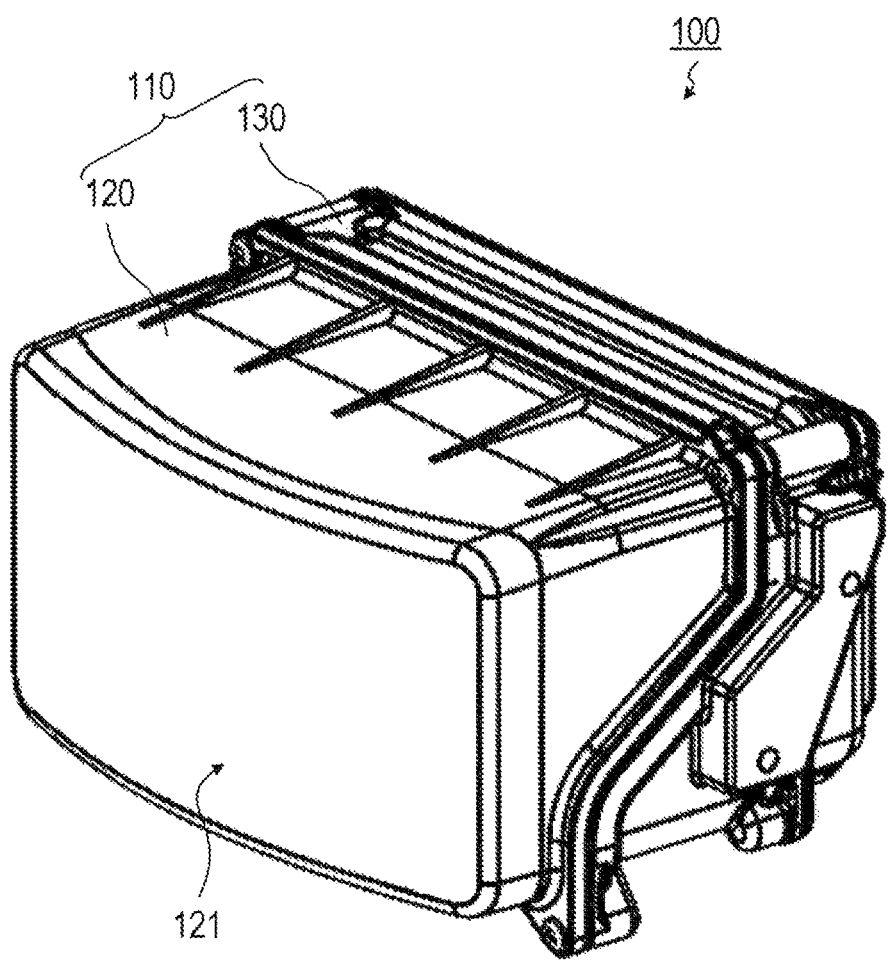
FIG. 2 shows an external appearance of the lidar device.
Figure 3:
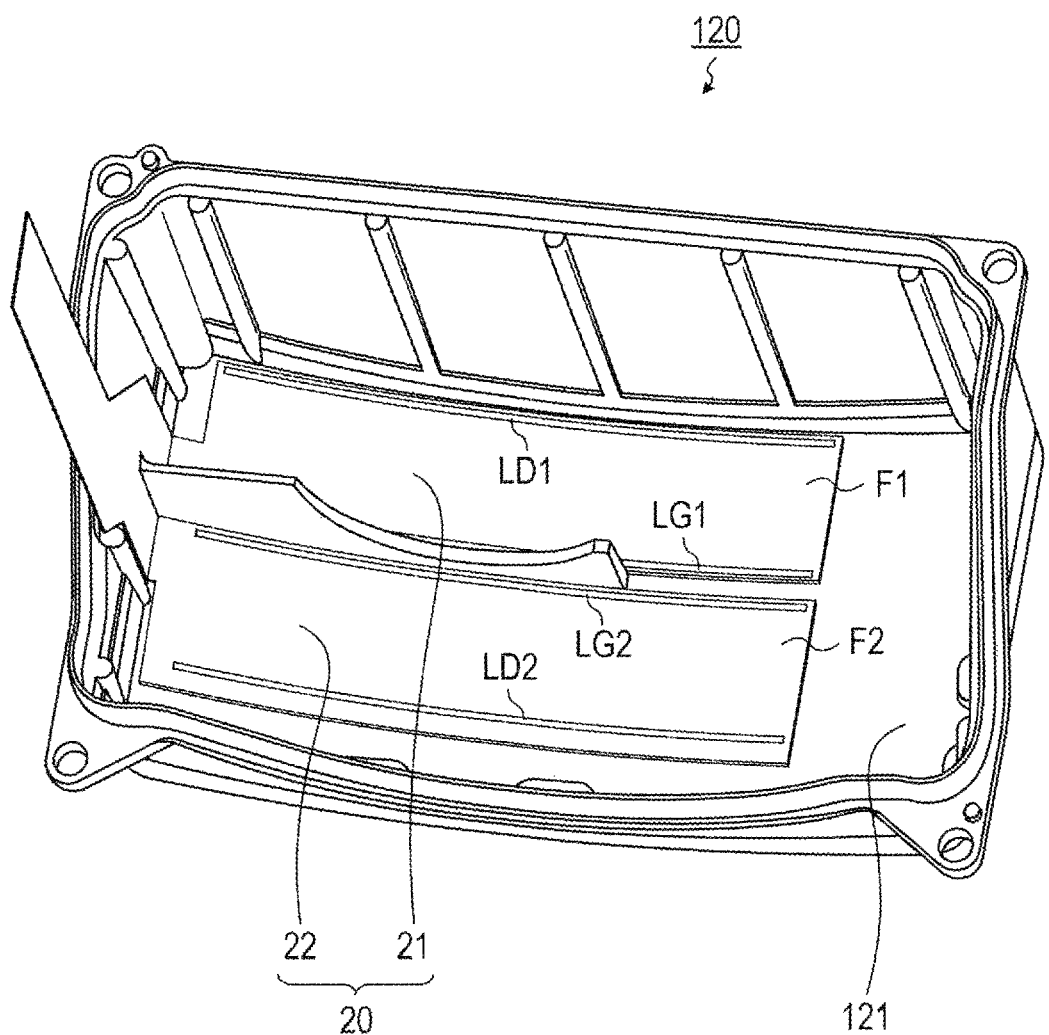
FIG. 3 shows a cover of the lidar device viewed from inside.

The measurement device 10 is stored inside a case 110 of the lidar device 100 shown in FIG. 2 that includes a cover 120 and a case body 130. The irradiation unit 11 of the measurement device 10 is stored in an upper region of a space inside the case 110. On the other hand, the detection unit 12 of the measurement device 10 is stored in a lower region of the space inside the case 110.

As a part of the cover 120, a transmission window 121 that is transparent and through which light is transmitted is provided on the front of the cover 120. The front here indicates a direction toward which light is emitted from the lidar device 100. The inside and the outside of the lidar device 100 are separated from each other by the transmission window 121.

The heater 20 is configured to heat the transmission window 121 from an inner portion of the lidar device 100, i.e., from the inside of the lidar device 100. As shown in FIG.

3, the heater 20 is provided on an inner surface of the transmission window 121. The heater 20 includes an irradiation-side heater 21 that is provided on the irradiation unit 11 side of the transmission window 121, and a detection-side heater 22 that is provided on the detection unit 12 side of the transmission window 121. Each of the irradiation-side heater 21 and the detection-side heater 22 includes a transparent conductive film Fi and a pair of electrodes LDi and LGi. Note that i is 1 for the transparent conductive film and the electrodes belonging to the irradiation-side heater 21, and i is 2 for the transparent conductive film and the electrodes belonging to the detection-side heater 22. The transparent conductive film Fi is a heater film made of a material having transparency and electrical conductivity. The transparent conductive film Fi may be, for example, an ITO film. ITO is indium tin oxide.

The inside air temperature sensor 30 is provided inside the lidar device 100, and detects an inside air temperature which is an air temperature inside the lidar device 100.

The control unit 40 is mainly composed of a microcomputer including a CPU, a RAM, a ROM, an I/O, a bus line connecting these components, and the like, and performs various processes. As functional blocks implemented by executing a program stored in the ROM, i.e., virtual components, the control unit 40 includes a distance calculation unit 41, a target energization amount determination unit 42, a possible energization amount estimation unit 43, a control value determination unit 44, and a heater energization unit 45.

The distance calculation unit 41 is configured to obtain a distance to an object irradiated with light, by using the measurement device 10. Specifically, on the basis of a waveform of an electrical signal inputted from the detection unit 12 to the distance calculation unit 41, the distance calculation unit 41 specifies a timing at which a reflected wave is detected, and obtains a distance to an object on the basis of a difference between the specified timing and a timing at which light is emitted. Other than the distance, the distance calculation unit 41 can obtain information on an object such as an azimuth of the object.

The target energization amount determination unit 42 is configured to determine a target amount of energization to the heater 20 (hereinafter also referred to as a target energization amount) according to an inside air temperature acquired from the inside air temperature sensor 30 and an outside air temperature which is an air temperature outside the lidar device 100. As the amount of energization of the heater 20, the target energization amount determination unit 42 may determine electric power which is an energization amount per unit time. The target energization amount determination unit 42 acquires an outside air temperature from an outside air temperature sensor 50 that is mounted on the vehicle. The outside air temperature sensor 50 is provided at a lower portion of the vehicle, and detects an air temperature outside the vehicle.

The possible energization amount estimation unit 43 is configured to estimate an amount of energization that can be supplied from a battery 51 of the vehicle (hereinafter also referred to as a possible energization amount) on the basis of a battery voltage detected for the battery 51.

The control value determination unit 44 is configured to determine a control value for control of energization of the heater 20 by the heater energization unit 45 (described later). In the present embodiment, the control value is a duty ratio which is a ratio between energization time and non-energization time of the heater 20. The control value determination unit 44 determines the duty ratio according to the target energization amount determined by the target energization amount determination unit 42 and the possible energization amount estimated by the possible energization amount estimation unit 43. In the present embodiment, the battery 51 of the vehicle is directly connected to the heater 20 not through a constant voltage circuit or the like, and accordingly, a voltage applied to the heater 20 is changed due to a change in the battery voltage. Thus, according to the amount of energization that can be currently supplied from the battery 51, the control value determination unit 44 determines the duty ratio so that the actual amount of energization of the heater 20 is the target energization amount determined by the target energization amount determination unit 42.

The heater energization unit 45 is configured to control energization of the heater 20 on the basis of the control value determined by the control value determination unit 44.

1-2. Process

Figure 4:
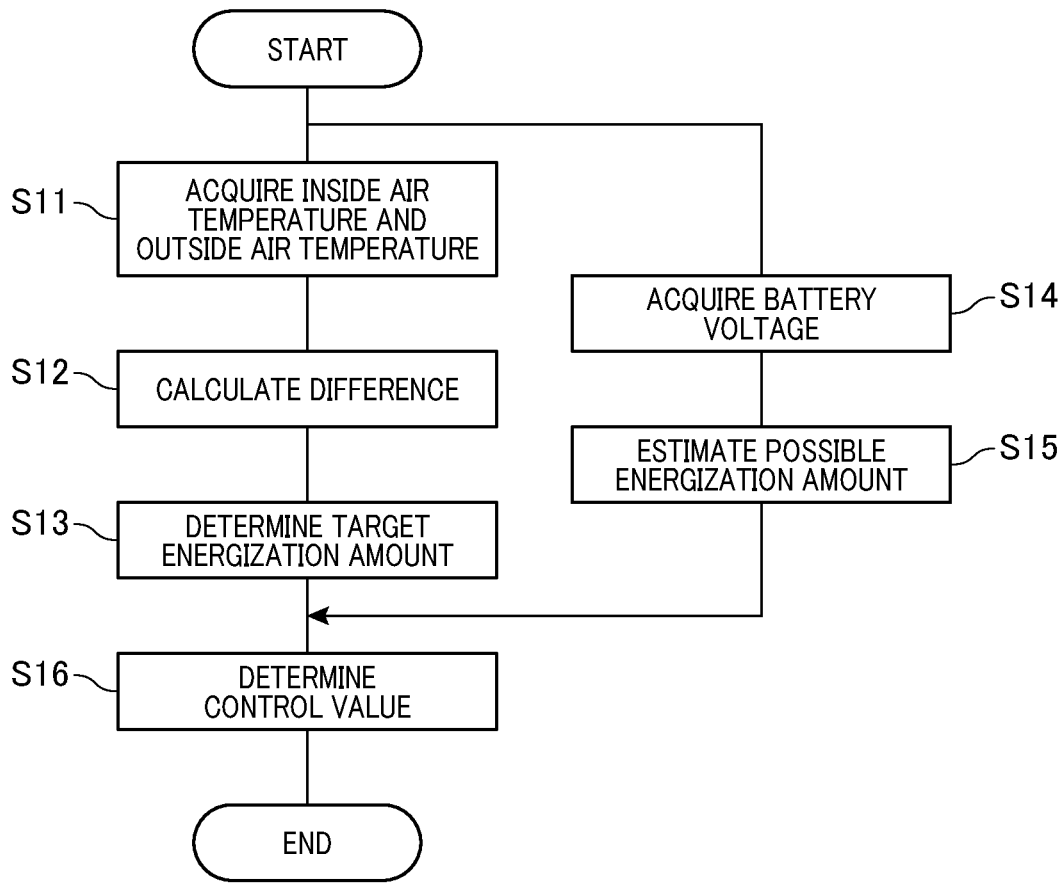
FIG. 4 is a flow chart of a determination process performed by a control unit in the first embodiment.

A determination process performed by the control unit 40 will be described with reference to a flow chart in FIG. 4. The determination process in FIG. 4 is repeatedly performed in a predetermined cycle after an ignition switch of the vehicle is turned on.

First, at S11, the control unit 40 acquires an inside air temperature and an outside air temperature from the inside air temperature sensor 30 and the outside air temperature sensor 50, respectively.

Subsequently, at S12, the control unit 40 calculates a difference between the inside air temperature and the outside air temperature.

Subsequently, at S13, the control unit 40 determines a target energization amount on the basis of the difference between the inside air temperature and the outside air temperature. Specifically, the control unit 40 obtains a target energization amount by referring to a table in which an appropriate target energization amount is set for each difference between the inside air temperature and the outside air temperature. S11 to S13 correspond to a process performed by the control unit 40 as the target energization amount determination unit 42.

The target energization amounts in the table are set so that the control unit 40 operates the heater 20 when an absolute value of the difference between the inside air temperature and the outside air temperature is a predetermined value or more. Thus, when the absolute value of the difference between the inside air temperature and the outside air temperature is small, the target energization amount is 0, and the control unit 40 does not operate the heater 20. On the other hand, when the absolute value of the difference between the inside air temperature and the outside air temperature is large, fogging of the transmission window 121 is more likely to occur. In this case, the control unit 40 prevents fogging by operating the heater 20 according to the target energization amount set in advance.

The target energization amount when the absolute value of the difference between the inside air temperature and the outside air temperature is large is specifically set as follows.

When the difference between the inside air temperature and the outside air temperature is large in the case where the inside air temperature is low and the outside air temperature is high, condensation occurs on the outside of the transmission window 121 and causes fogging of the transmission window 121. In this case, when the transmission window 121 whose temperature is lower than the outside air temperature is heated by the heater 20, presumably, a temperature difference between the outer surface of the transmission window 121 and the outside air temperature is reduced and fogging of the transmission window 121 is less likely to occur. Thus, the target energization amount when the inside air temperature is lower than the outside air temperature and the absolute value of the difference between the inside air temperature and the outside air temperature is the predetermined value or more is set so that the temperature of the transmission window 121 approaches the outside air temperature.

On the other hand, when the difference between the inside air temperature and the outside air temperature is large in the case where the inside air temperature is high and the outside air temperature is low, condensation occurs on the inside of the transmission window 121 and causes fogging of the transmission window 121. Also, in this case, when the transmission window 121 whose temperature is lower than the inside air temperature is heated by the heater 20, presumably, a temperature difference between the inner surface of the transmission window 121 and the inside air temperature is reduced and fogging of the transmission window 121 is less likely to occur.

When the inside air temperature is low and the outside air temperature is high, fogging occurs on the outside of the transmission window 121. Thus, water adhered to the transmission window 121, which is a cause of fogging, is expected to be removed by wind blowing to the outer surface of the transmission window 121 during traveling of the vehicle. On the other hand, when the inside air temperature is high and the outside air temperature is low, fogging occurs on the inside of the transmission window 121. Thus, unlike when fogging occurs on the outside of the transmission window 121, adhered water droplets are less likely to be removed.

In this case, in order to evaporate the water adhered to the transmission window 121, it is more preferable to significantly increase the amount of energization of the heater 20 than to merely eliminate the temperature difference between the inner surface of the transmission window 121 and the inside air temperature. Thus, the target energization amount when the inside air temperature is higher than the outside air temperature and the absolute value of the difference between the inside air temperature and the outside air temperature is the predetermined value or more is set so that the water adhered to the transmission window 121 is evaporated.

Figure 5:
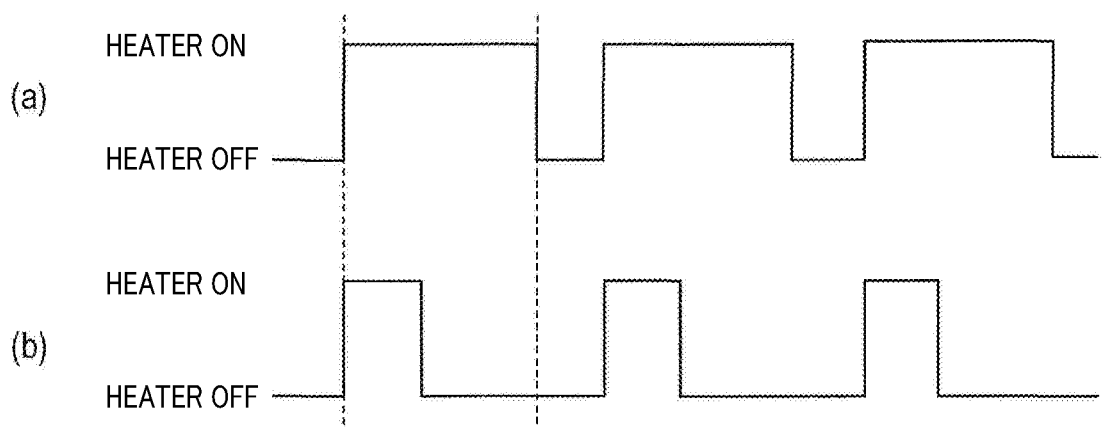
FIG. 5 shows a ratio of energization time of a heater.

Therefore, in the case where the absolute value of the difference between the inside air temperature and the outside air temperature is the same, the target energization amount when the heater 20 is operated at the inside air temperature higher than the outside air temperature is always larger than the target energization amount when the heater 20 is operated at the inside air temperature lower than the outside air temperature. FIG. 5 (a) shows energization of the heater 20 when the inside air temperature is higher than the outside air temperature, and FIG. 5 (b) shows energization of the heater 20 when the inside air temperature is lower than the outside air temperature.

As shown in FIG. 5 (a) and (b), a ratio of energization time when the inside air temperature is higher than the outside air temperature is usually higher than a ratio of energization time when the inside air temperature is lower than the outside air temperature. At S14, the control unit 40 acquires a detection value of the battery voltage.

Subsequently, at S15, the control unit 40 estimates a possible energization amount on the basis of the acquired detection value of the battery voltage. S14 to S15 correspond to a process performed by the control unit 40 as the possible energization amount estimation unit 43.

Subsequently, at S16, the control unit 40 determines a duty ratio on the basis of the target energization amount determined at S13 and the possible energization amount estimated at S15. S16 corresponds to a process performed by the control unit 40 as the control value determination unit 44.

Then, the control unit 40 ends the determination process in FIG. 4.

Separately from the determination process in FIG. 4, the control unit 40 performs a process of controlling energization of the heater 20 on the basis of the duty ratio determined in the determination process in FIG. 4. This process corresponds to a process performed by the control unit 40 as the heater energization unit 45.

1-3. Effects

The first embodiment described above in detail achieves the following effects.

(1a) The control unit 40 is configured to control energization of the heater 20 according to the inside air temperature and the outside air temperature; thus, fogging of the transmission window 121 can be prevented.

(1b) Specifically, when the absolute value of the difference between the inside air temperature and the outside air temperature is the predetermined value or more, the control unit 40 operates the heater 20. With such a configuration, the heater 20 is operated corresponding to a situation where fogging of the transmission window 121 may occur; thus, as compared with the case where the heater 20 is always operated, power consumption of the heater 20 can be reduced.

(1c) The control unit 40 controls energization of the heater 20 also considering the battery voltage detected for the battery 51 of the vehicle. This makes it possible to prevent a change in the actual amount of energization of the heater 20 due to a change in the battery voltage.

2. Second Embodiment

2-1. Differences From First Embodiment

A basic configuration of a second embodiment is the same as that of the first embodiment. Thus, common configuration will not be described and mainly differences from the first embodiment will be described.

Figure 6:
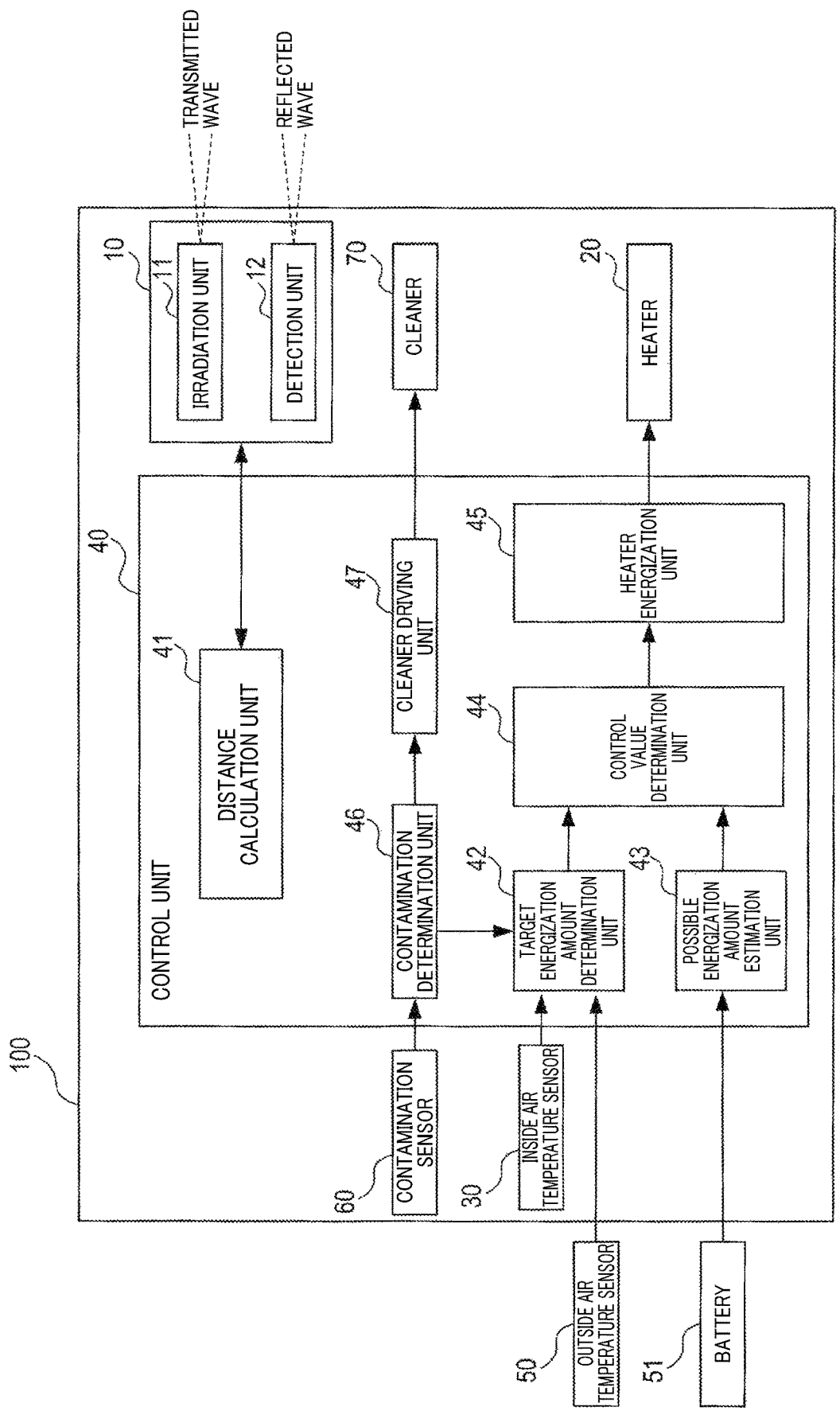
FIG. 6 is a block diagram showing a configuration of the lidar device of a second embodiment.

As shown in FIG. 6, in addition to the components of the lidar device 100 of the first embodiment, the lidar device 100 of the second embodiment further includes a contamination sensor 60 that detects contamination of the transmission window 121, and a cleaner 70 that cleans the transmission window 121. Furthermore, in addition to the components of the control unit 40 of the first embodiment, the control unit 40 of the second embodiment further includes a contamination determination unit 46 and a cleaner driving unit 47 as the functional blocks.

The contamination determination unit 46 is configured to determine on the basis of a result of detection by the contamination sensor 60 whether the transmission window 121 is contaminated. The contamination sensor 60 irradiates the transmission window 121 with light that is different from light emitted from the irradiation unit 11, and detects the degree of contamination on the basis of the reflectance of light on the transmission window 121. When the degree of contamination detected by the contamination sensor 60 is a predetermined threshold or more, the contamination determination unit 46 determines that the transmission window 121 is contaminated.

The cleaner driving unit 47 is configured to drive the cleaner 70 on the basis of a result of determination by the contamination determination unit 46. In the present embodiment, the cleaner 70 is a washer that cleans the outer surface of the transmission window 121 with a cleaning liquid.

A main difference between the first embodiment and the second embodiment is that when the contamination determination unit 46 determines that the transmission window 121 is not contaminated, the control unit 40 does not perform determination of the target energization amount by the target energization amount determination unit 42, estimation of the possible energization amount by the possible energization amount estimation unit 43, or determination of the control value by the control value determination unit 44. Specific determination process performed by the control unit 40 will be described later.

2-2. Process

Figure 7:
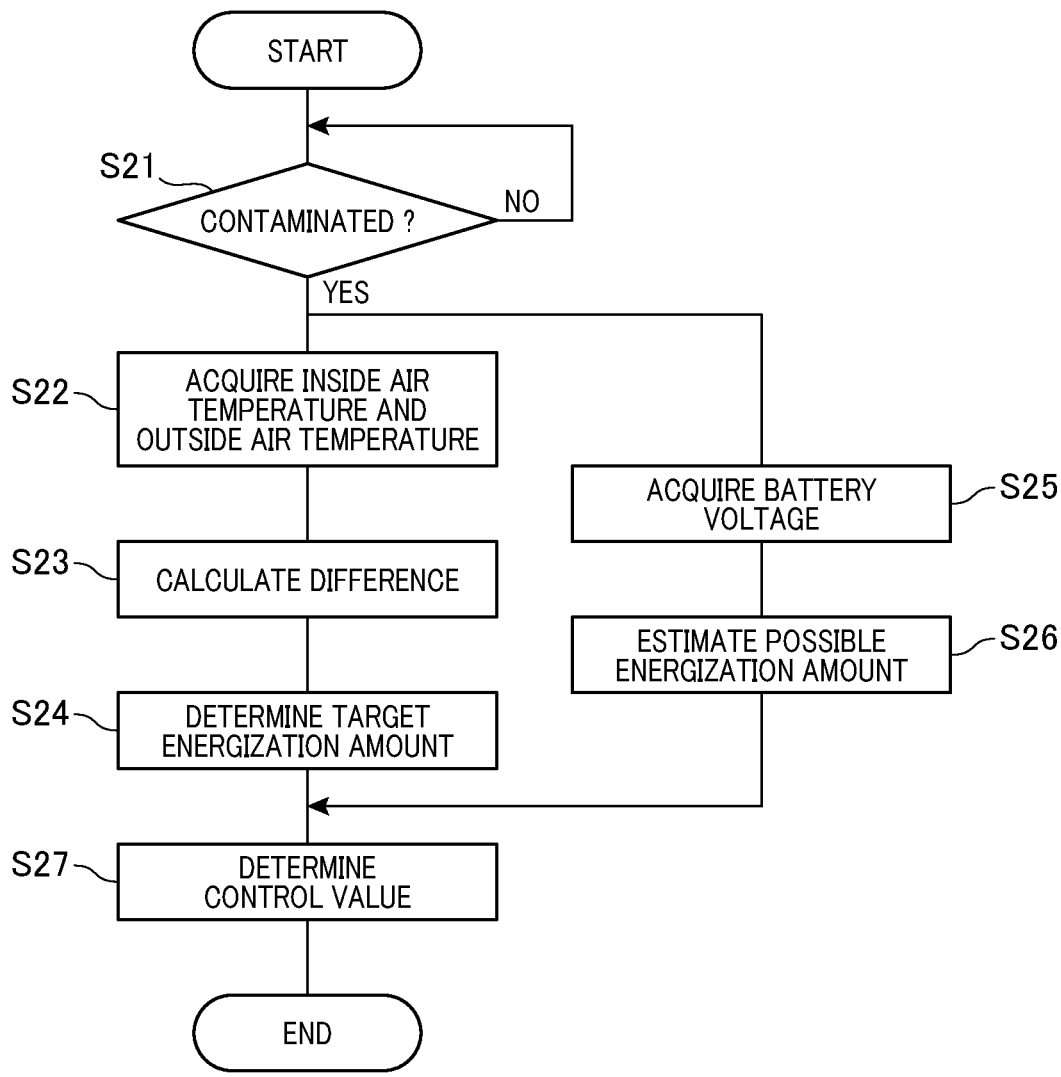
FIG. 7 is a flow chart of a determination process performed by the control unit in the second embodiment.

The determination process of the second embodiment performed by the control unit 40 instead of the determination process of the first embodiment will be described with reference to a flow chart in FIG. 7. The determination process in FIG. 7 is repeatedly performed in a predetermined cycle after the ignition switch of the vehicle is turned on.

First, at S21, the control unit 40 determines whether the transmission window 121 is contaminated. S21 corresponds to a process performed by the control unit 40 as the contamination determination unit 46.

When the control unit 40 determines at S21 that the transmission window 121 is not contaminated, control return to S21. On the other hand, when the control unit 40 determines at S21 that the transmission window 121 is contaminated, control proceeds to S22.

Subsequent processes are the same as in the first embodiment.

2-3. Effects

The second embodiment described above in detail achieves the following effect in addition to the effects of the first embodiment described above.

(2a) In the second embodiment, the control unit 40 determines whether the transmission window 121 is contaminated, and when the control unit 40 determines that the transmission window 121 is not contaminated, the control unit 40 does not operate the heater 20. Fogging of the transmission window 121 is detected as contamination of the transmission window 121. Thus, when the transmission window 121 is not contaminated, the transmission window 121 is unlikely to be fogged. Therefore, with such a configuration, the heater 20 is not operated when the transmission window 121 is unlikely to be fogged; thus, power consumption can be reduced.

3. Third Embodiment

3-1. Differences From First Embodiment

A basic configuration of a third embodiment is the same as that of the first embodiment. Thus, a common configuration will not be described and differences from the first embodiment will be mainly described.

Figure 8:
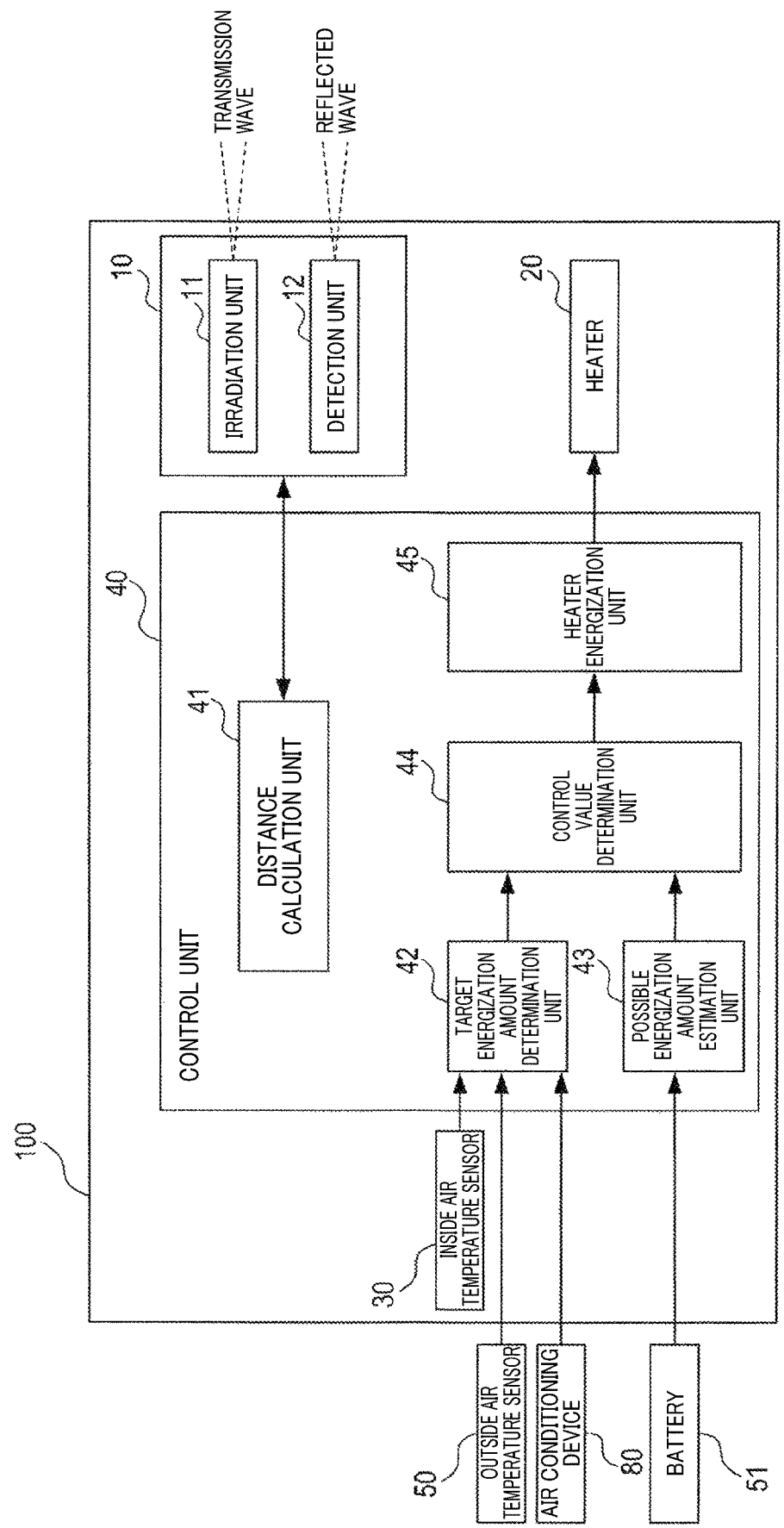
FIG. 8 is a block diagram showing a configuration of the lidar device of a third embodiment.

As shown in FIG. 8, the third embodiment differs from the first embodiment in that the target energization amount determination unit 42 is configured to acquire an operation mode of an air conditioning device 80 of the vehicle on which the lidar device 100 is mounted and determine the target energization amount considering the operation mode of the air conditioning device 80 in addition to the inside air temperature and the outside air temperature.

3-2. Process

Figure 9:
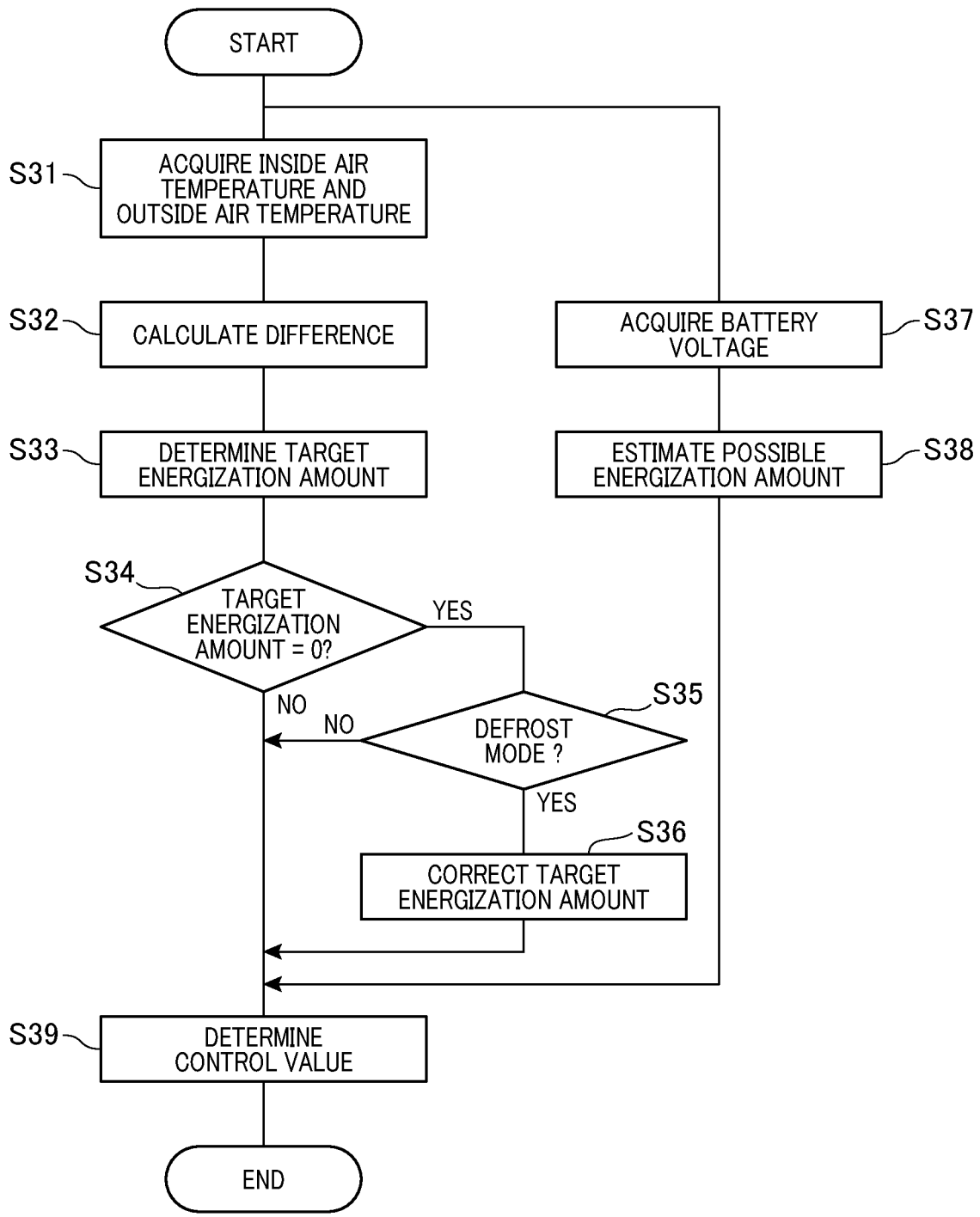
FIG. 9 is a flow chart of a determination process performed by the control unit in the third embodiment.

A determination process of the third embodiment performed by the control unit 40 instead of the determination process of the first embodiment will be described with reference to a flow chart in FIG. 9.

S31 to S33 are the same as S11 to S13 of the first embodiment.

Subsequently, at S34, the control unit 40 determines whether the target energization amount determined at S33 is 0.

When the control unit 40 determines at S34 that the target energization amount is 0, control proceeds to S35, and the control unit 40 determines whether the operation mode of the air conditioning device 80 is a defrost mode. The defrost mode is a mode in which in order to remove fogging from a windshield of the vehicle, the air conditioning device 80 blows out conditioned air toward the windshield.

On the other hand, when the control unit 40 determines at S34 that the target energization amount is not 0, control proceeds to S39.

When the control unit 40 determines at S35 that the operation mode of the air conditioning device 80 is the defrost mode, control proceeds to S36 and the control unit 40 corrects the target energization amount, and then control proceeds to S39. Specifically, at S36, the control unit 40 corrects the target energization amount to a predetermined positive value so that the heater 20 is operated.

On the other hand, when the control unit 40 determines at S35 that the operation mode of the air conditioning device 80 is not the defrost mode, S36 is skipped and control proceeds to S39.

At S37, the control unit 40 acquires a detection value of the battery voltage.

Subsequently, at S38, the control unit 40 estimates a possible energization amount on the basis of the detection value of the battery voltage acquired at S37.

Subsequently, at S39, the control unit 40 determines a duty ratio on the basis of the target energization amount determined at S33 and the possible energization amount estimated at S38, and then the control unit 40 ends the determination process in FIG. 9. S31 to S36 correspond to a process performed by the control unit 40 as the target energization amount determination unit 42, S37 to S38 correspond to a process performed by the control unit 40 as the possible energization amount estimation unit 43, and S39 corresponds to a process performed by the control unit 40 as the control value determination unit 44.

3-3. Effects

The third embodiment described above in detail achieves the following effect in addition to the effects of the first embodiment described above.

(3a) In the third embodiment, the control unit 40 operates the heater 20 when the operation mode of the air conditioning device 80 is the defrost mode. That is, the control unit 40 operates the heater 20 when a measure has been taken to remove fogging from the windshield in the vehicle. When the windshield in the vehicle is fogged, the transmission window 121 of the lidar device 100 may also be fogged. Therefore, with such a configuration, even when the target energization amount determined by the target energization amount determination unit 42 is 0, it is possible to detect fogging of the transmission window 121 and operate the heater 20; thus, fogging of the transmission window 121 can be prevented with high accuracy.

4. Other Embodiments

The embodiments of the present disclosure have been described above. However, it is needless to say that the present disclosure is not limited to the above embodiments and may be implemented in various forms.

(4a) In the above embodiments, the control unit 40 is configured to operate the heater 20 when the absolute value of the difference between the inside air temperature and the outside air temperature is the predetermined value or more and not to operate the heater 20 when the absolute value of the difference between the inside air temperature and the outside air temperature is less than the predetermined value. However, the predetermined value when the inside air temperature is lower than the outside air temperature may be a value different from the predetermined value when the inside air temperature is higher than the outside air temperature. Furthermore, the control unit 40 may be configured to operate the heater 20 only when the inside air temperature is lower than the outside air temperature or only when the inside air temperature is higher than the outside air temperature. Thus, the control unit 40 may be configured to operate the heater 20 when the inside air temperature is lower than the outside air temperature and the absolute value of the difference between the inside air temperature and the outside air temperature is the predetermined value or more, but not to operate the heater 20 when the absolute value of the difference between the inside air temperature and the outside air temperature is large in the case where the inside air temperature is higher than the outside air temperature.

(4b) In the above embodiments, the control unit 40 determines the target energization amount to the heater 20 on the basis of the difference between the inside air temperature and the outside air temperature, but the method of determining the target energization amount is not limited to this. Specifically, for example, the control unit 40 may obtain the target energization amount by using a map of the target energization amount in which an appropriate target energization amount is set on the basis of the inside air temperature and the outside air temperature or a function by which the target energization amount is calculated using the inside air temperature and the outside air temperature as parameters.

(4c) In the above embodiments, energization of the heater 20 is controlled by changing the duty ratio which is a ratio between the energization time and the non-energization time of the heater 20, but the method of controlling energization of the heater 20 is not limited to this. Specifically, for example, energization of the heater 20 may be controlled by changing the voltage applied to the heater 20.

(4d) In the above embodiments, the control unit 40 controls energization of the heater 20 also considering the battery voltage in addition to the inside air temperature and the outside air temperature, but the control unit 40 may control energization of the heater 20 without considering the battery voltage.

(4e) In the second embodiment, the transmission window 121 is irradiated with light different from light emitted from the irradiation unit 11, and the degree of contamination is detected on the basis of the reflectance of light on the transmission window 121, but the method of detecting the degree of contamination is not limited to this. For example, the degree of contamination may be detected on the basis of the reflectance on the transmission window 121 of light emitted from the irradiation unit 11 of the lidar device 100.

(4f) In the third embodiment, a washer is presented as an example of the cleaner 70, but the cleaner 70 is not limited to this. Specific examples of the cleaner 70 include a wiper that wipes off dirt on the transmission window 121 and an ultrasonic vibrator that causes dirt adhered to the transmission window 121 to fall off.

(4g) The outside air temperature used to determine the target energization amount may be corrected on the basis of a result of detection by a solar radiation sensor that is provided in the vehicle on which the lidar device 100 is mounted or an ON/OFF state of a light of the vehicle. The outside air temperature sensor 50 is usually provided at a position distant from the lidar device 100. Thus, in some cases, the outside air temperature around the lidar device 100 differs from the outside air temperature detected by the outside air temperature sensor 50. Specifically, for example, when the outside air temperature sensor 50 is provided at the lower portion of the vehicle, the outside air temperature sensor 50 is less likely to be influenced by sunlight, and accordingly, in some cases, the outside air temperature around the lidar device 100 is higher than the temperature detected by the outside air temperature sensor 50. Thus, the outside air temperature used to determine the target energization amount may be corrected according to the result of detection by the solar radiation sensor so that the outside air temperature used to determine the target energization amount is higher than the outside air temperature detected by the outside air temperature sensor 50. Furthermore, the outside air temperature used to determine the target energization amount may be corrected according to the ON/OFF state of the light so that when the light is OFF, i.e., during daytime, the outside air temperature used to determine the target energization amount is higher than the outside air temperature detected by the outside air temperature sensor 50.

(4h) Furthermore, the outside air temperature used to determine the target energization amount may be corrected on the basis of information on a road on which the vehicle is travelling. Specifically, for example, in a cold district, an air temperature inside a tunnel is higher than an air temperature outside the tunnel, and when the vehicle exits the tunnel, the outside air temperature suddenly decreases, and accordingly, in some cases, heating of the transmission window 121 by the heater 20 is insufficient and fogging of the transmission window 121 occurs. Thus, even when the vehicle is travelling in a tunnel, the control unit 40 may determine the target energization amount on the basis of the outside air temperature before the vehicle enters the tunnel.

(4i) The target energization amount may be corrected on the basis of weather conditions around the vehicle. Specifically, for example, during rain or snow, heat is more likely to be removed from the transmission window 121 by rain or snow; thus, a large energization amount is required as compared with the case where there is no rain or snow. The control unit 40 may correct the target energization amount so that the amount of energization of the heater 20 is large in such a case. Information on the weather around the vehicle can be acquired from an information communication system such as VICS. VICS is registered trademark.

(4j) Furthermore, the target energization amount may be corrected on the basis of a vehicle speed or a speed to be reached by the vehicle that is estimated from acceleration of the vehicle. This is because heat is more likely to be removed from the transmission window 121 at a high vehicle speed than at a low vehicle speed. Furthermore, the target energization amount may be corrected on the basis of information on a road on which the vehicle is travelling. Specifically, for example, the vehicle speed is assumed to be high on an expressway; thus, the control unit 40 may correct the target energization amount so that the amount of energization of the heater 20 becomes large when the vehicle enters an expressway.

(4k) In the above embodiments, a lidar device is presented as an example of the distance measuring device, but the type of the distance measuring device is not limited to this. Specific examples of the distance measuring device include a millimeter wave radar device and an ultrasonic sensor device.

(4l) In the above embodiments, the lidar device 100 is mounted at the front portion of the vehicle, but the mounting position of the lidar device 100 in the vehicle is not limited to this. Specifically, for example, the lidar device 100 may be mounted at a peripheral portion of the vehicle such as a side or rear portion of the vehicle.

(4m) In the above embodiments, the transmission window 121 is a window through which both a transmitted wave and a reflected wave are transmitted, but the transmission window 121 may be configured such that at least one of a transmitted wave and a reflected wave is transmitted through the transmission window 121. Furthermore, in the above embodiments, the transmission window 121 is transparent so that light as a transmitted wave can be transmitted through the transmission window 121, but the transmission window 121 does not need to be transparent as long as a transmitted wave is transmitted through the transmission window 121. Thus, the transmission window 121 may be made of various materials according to the type of transmitted wave.

(4n) In the above embodiments, the function of a single component may be divided into a plurality of components, or the functions of a plurality of components may be integrated into a single component. Furthermore, part of the configuration of the embodiments may be omitted. Furthermore, at least part of the configuration of the embodiments may be, for example, added to or replaced with another configuration of the embodiments.

(4o) Other than the lidar device 100, the present disclosure may also be implemented in various forms such as the control unit 40 constituting the lidar device 100, a program for functioning a computer as the control unit 40, a medium that records the program, and a method of controlling energization of the heater 20 of the lidar device 100.

What is claimed is:

1. A distance measuring device configured to emit a transmitted wave and detect a reflected wave from an object irradiated with the transmitted wave to measure a distance to the object, the distance measuring device comprising:
   a transmission window through which at least one of the transmitted wave and the reflected wave is transmitted;
   a heater configured to heat the transmission window from an inside of the distance measuring device; and
   a control unit configured to control energization of the heater according to an inside air temperature which is an air temperature inside the distance measuring device and an outside air temperature which is an air temperature outside the distance measuring device,
   wherein
   in a case where an absolute value of a difference between the inside air temperature and the outside air temperature is the same as the difference between the inside air temperature and the outside air temperature, the control unit works to control an amount of energization of the heater when the heater is operated at the inside air temperature higher than the outside air temperature to be larger than an amount of energization of the heater when the heater is operated at the inside air temperature lower than the outside air temperature.

2. The distance measuring device according to claim 1, wherein
   the control unit operates the heater when the inside air temperature is lower than the outside air temperature and an absolute value of a difference between the inside air temperature and the outside air temperature is a predetermined value or more.

3. The distance measuring device according to claim 1, wherein
   the control unit operates the heater when the inside air temperature is higher than the outside air temperature and an absolute value of a difference between the inside air temperature and the outside air temperature is a predetermined value or more.

4. The distance measuring device according to claim 1, wherein
   the control unit determines whether the transmission window is contaminated, and when the control unit determines that the transmission window is not contaminated, the control unit does not operate the heater.

5. The distance measuring device according to claim 1, wherein
   the control unit operates the heater when an operation mode of an air conditioning device of a vehicle on which the distance measuring device is mounted is a defrost mode.

* * * * *